UNITED STATES PATENT OFFICE.

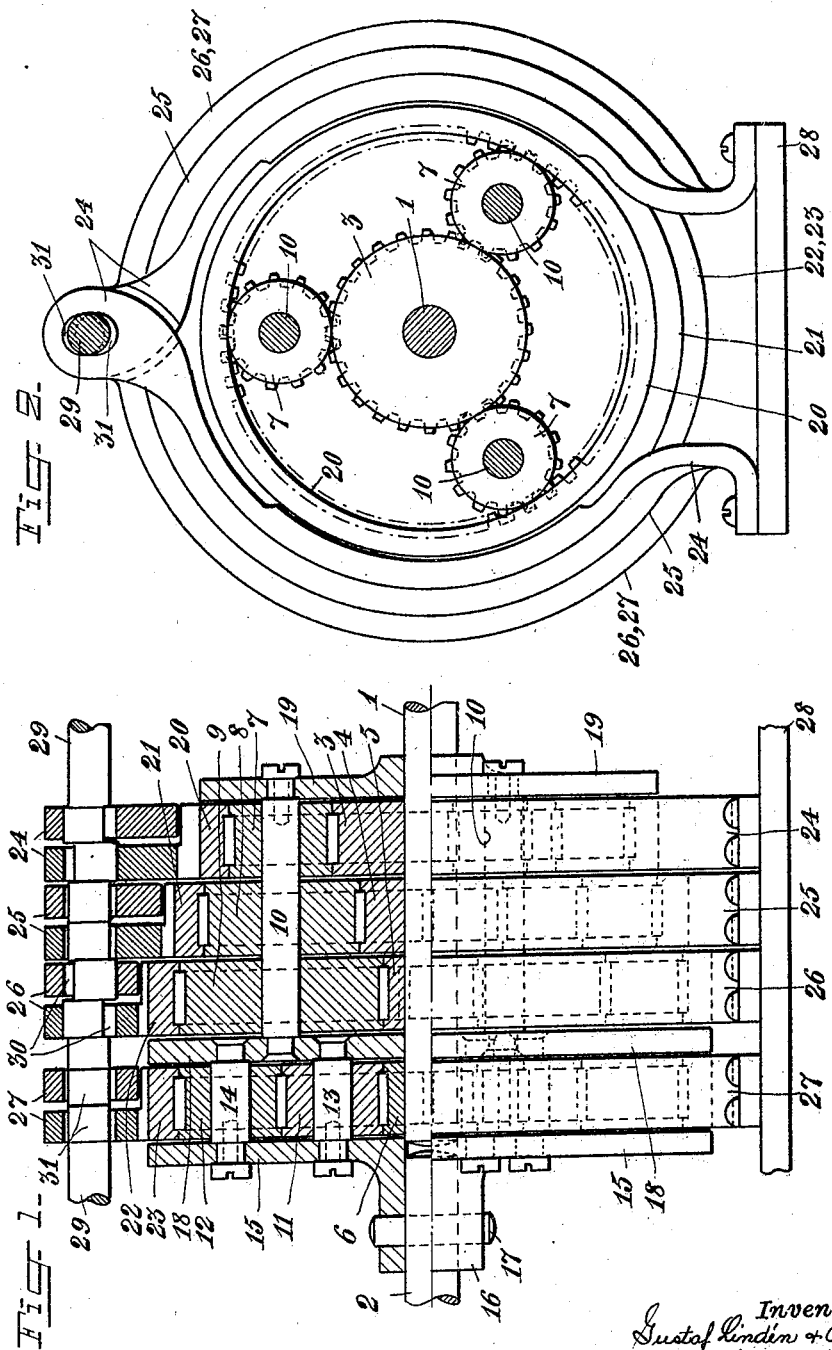

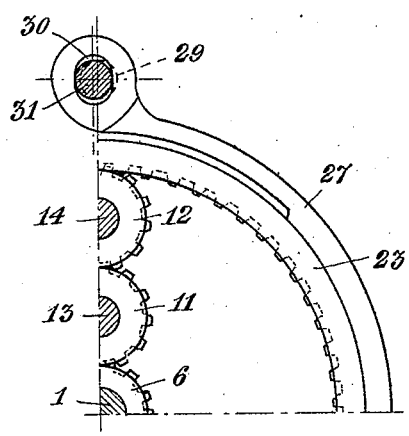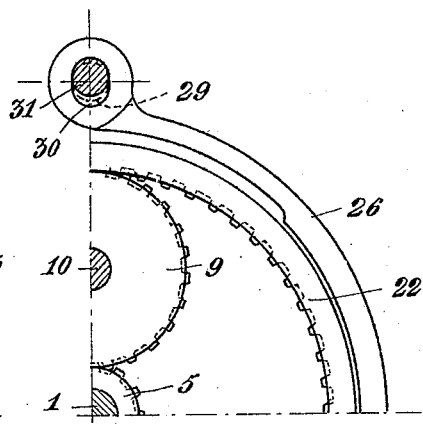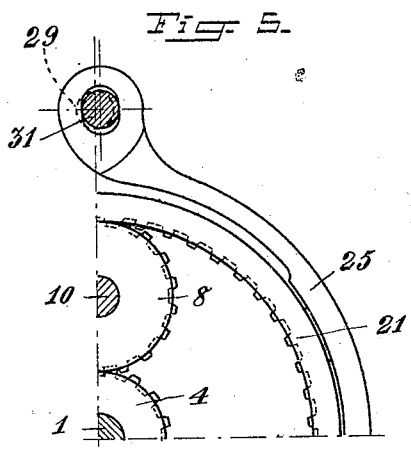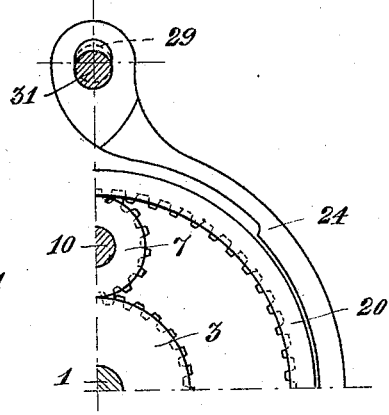

GUSTAF LINDÉN, OF NÄSSJÖ, AND ANDERS GUSTAF HÖJER, OF SÄRÄNGEN, NÄSSJÖ, SWEDEN, ASSIGNORS OF ONE-THIRD TO ERIK OLOF GUSTAF LUNDIN, OF HULTSFRED, SWEDEN.

VARIABLE-SPEED GEARING.

1,405,237.          Specification of Letters Patent.     Patented Jan. 31, 1922.

Application filed July 2, 1918. Serial No. 243,079.

(GRANTED UNDER THE PROVISIONS OF THE ACT OF MARCH 3, 1921, 41 STAT. L., 1313.)

*To all whom it may concern:*

Be it known that we, GUSTAF LINDÉN, a subject of the King of Sweden, residing at Nyhem 25A, Nässjö, in the Kingdom of Sweden, and ANDERS GUSTAF HÖJER, a subject of the King of Sweden, residing at Särängen, Nässjö, in the Kingdom of Sweden, have invented certain new and useful Improvements in Variable-Speed Gearing, (for which I have filed application in Sweden, Serial No. 717, March 10, 1917,) of which the following is a specification.

The present invention refers to a gearing arrangement which consists of several groups of gear wheels surrounded by, and engaging in, gear rims provided with interior teeth or cogs, each of which groups can be separately braked, according as one or another gear is to be connected or reversed.

The purpose of the invention is, firstly, to obtain a secure governing of the gear wheels and an easy and quiet running, in addition to security that the cogs do not "bottom" and break; secondly, that the coupling and the uncoupling of the various toothed gears may take place easily and without noticeable transition; thirdly, that all disturbing noises in uncoupling may disappear, and, lastly, that the change may take place so rapidly that there will arise no necessity for a slowing down of the running of the machinery which is connected with the gearing arrangement.

The arrangement is specially suitable for motor-cars and such like vehicles, where it can replace, to the greatest advantage, the gearing arrangements hitherto employed which, as far as the aims mentioned above are concerned, are defective to a greater or less degree.

Our invention relates more particularly to means for operating band-brakes adapted to control a series of gears whereby motion is transmitted from a driving to a driven member, the speed imparted to the driving member depending upon the gear or gears braked at any particular time. We provide an improved structure of brake bands arranged in pairs, and controlling means, such as a shaft extending through said bands, and adapted to tighten each pair in succession, and preferably to provide, between the operation of each pair of bands, positions in which all the bands are released. These and other objects of our invention will be more clearly understood from the following description taken in connection with the accompanying drawing.

The appended drawing shows an embodiment of the invention. Fig. 1 shows the arrangement seen from the side, partly in section, and Fig. 2 shows the same seen from one end. Figs. 3-6 illustrate those parts of the braking arrangement which correspond to the different gearings and the reversing.

1 and 2 are two shafts in alignment with each other, of which 1 is taken as being the driving shaft, and 2 the driven one. On the shaft 1 there is fastened a row of tooth wheels 3, 4 and 5, of different dimensions for obtaining different speeds in one direction, and a tooth wheel 6 for reversing. Around each of the tooth wheels 3, 4 and 5 there are arranged, at equal angular distances from each other, three drivers or pinions 7, 8 and 9 respectively, of equal size, which are carried by three shafts 10. The drivers 7, 8 and 9 form, consequently, three groups with three drivers in each group, the wheels of each group being of different sizes. Around the wheel 6 there are also arranged three drivers 11 which engage three drivers 12 arranged outside the drivers 11. The drivers 11 and 12 are carried by their respective pins 13 and 14 which are fastened on a disc 15 attached to the shaft 2 by means of the nave 16 and the bolt 17. The pins 13 and 14 are also fixed to a disc 18 which is rotatable on the shaft 1. On the disc 18 there are fastened shafts 10, the outer ends of which are connected with a disc 19 which, too, is rotatable on the shaft 1. The discs 15, 18 and 19 thus form, together with the shafts 10, 13 and 14, and the drivers sitting on these shafts, a rigid frame which is firmly attached to the shaft 2 and takes part in the revolutions of the latter, while, on the other hand, the wheels 3, 4 and 5 form a whole with the shaft 1, and rotate with the latter. Further, the drivers 7, 8, 9 and 12 stand in continuous engagement with the gear rims 20, 21, 22 and 23 provided with interior tooth wheels. The gear rims are carried and supported by the respective drivers 7, 8, 9 and 12, and are retained by these in a concentric position.

In order to obtain a secure governing and an easy and quiet running, and in order to prevent the teeth from "bottoming" in each other, all the tooth wheels, drivers and gear rims are, in accordance with the invention, provided with contact surfaces, the position of which is determined by the pitch circles. The surfaces of contact, which are preferably arranged on each side of the respective tooth-paths, but which can also be arranged within the said paths, i. e. between the ends of the teeth, can either be made in one piece with the tooth-wheels, etc., as shown in the drawing, or else can consist of rims, or the like, arranged at the sides of the tooth wheels.

In consequence of the driving shaft being surrounded, in accordance with the above, by three groups of tooth wheels arranged at equal angular distances from each other, the very essential advantage is gained that the rotation moment between the shaft and the tooth wheels will be divided equally between three contacts or engagements instead of one, as is usually the case. This results in a more uniform wear of the material, and no side pressure will arise in the bearings.

According to the invention, there are arranged around the cog-rims brake bands 24, 25, 26 and 27, each of which preferably consists of two halves fastened together at their lower parts by means of a common lower bearing or support, 28, and which, at their upper parts, can be drawn together around the respective gear rims. Both halves of each brake band are, at their upper ends, cut down into each other to half their breadth, and are so shaped that they form ears provided with longitudinal, vertical grooves, 30. When the grooves in the two ears lie opposite each other, the brake band is not drawn together, and not before the ears and, consequently, the grooves, have been carried some distance past each other, does braking ensue. In order to communicate this movement to the ears, there are arranged at each brake band two eccentrics or cams 31, shaped differently from each other, which, co-operating each with its groove in the two ears, are arranged at an angle of 180° to each other. The different pairs of eccentrics are arranged on a common shaft 29 so that they are rotated simultaneously with each other, and they are so adjusted in respect to each other that, on a rotation of the shaft 29, each one in its turn exercises a braking influence on the four gear rims 20, 21, 22, 23. In consideration of the fact that all the gear rims must remain unbraked between the reversal of one gearing and the coupling in of another gearing, the braking organ is so adjusted, that, in order to bring about the braking there is required, from the instant that this braking commences until the moment that it attains its maximum, a rotation less than one-eighth of a revolution, and, in order to stop the braking action, a further rotation which is also less than one-eighth of a revolution. Between the four positions of the shaft 29, each of which corresponds to a full braking of one of the four gear rims, there thus exist four other positions, displaced, one-eighth of a revolution in respect to the former ones, and in these said other four positions no braking takes place.

The operation is as follows:

The shaft 1 receives its movement from the motor and carries with it, in its rotation, the tooth wheels 3, 4, 5 and 6 which are arranged on the said shaft. If the shaft 29 and, consequently, the eccentrics, are so adjusted that no braking is exercised on any of the gear rims, the tooth wheels 3, 4, 5 and 6 will rotate the respective drivers, and these, in their turn, will rotate the various gear rims. The gear rim 23 will, in this process, and in consequence of the double drivers, be given a movement opposite to that of the other rims, this being dependent on the varying gearing conditions. If the shaft 29 is rotated one-eighth of a revolution, one of the gear rims is braked—rim 22 for example. As, however, the drivers 9, which are in engagement therewith, continue to rotate, they are compelled to describe at the same time a circular movement, rolling on the inner side of the gear rim 22. In this movement they carry with them the whole of the connected system comprising the discs 15, 18 and 19, and the shafts 10, 13 and 14, together with the shaft 2 which is connected with the said system. This shaft is rotated in the same direction as the shaft 1 and at a speed which is determined by the gearing conditions, such speed, in the present instance, being the lowest one. If the shaft 29 is further rotated another one-eighth of a revolution, the gear rim 22 is released without any of the other rims being braked, this latter action not taking place before a further rotation of one-eighth of a revolution. The gear rim is then preferably braked fast to the nearest higher or lower gearing which is thereby coupled in. The transition from the one gearing to a neighboring one is, therefore, carried out by rotating the shaft 29 only one fourth of a revolution. In this process, consequently, one is able to allow the release of, for example, the gear rim 22, to be immediately followed by the braking of the gear rim 21. The speed of the shaft 2 has not, consequently, had time to diminish as it has when the alteration of speed is carried out by means of an ordinary gearing arrangement, but the shaft 2 is brought gradually, and without interruption, to the new speed in proportion to the increasing braking of the gear rim 21. In this process the transition is easy and unnoticeable, and there can be no shaking of the shaft on changing the speed. By a further rotation of the shaft 29 the other gearings are coupled in and released in a similar way, and by braking the gear rim 23 a reversal is obtained, as the shaft 2, in consequence of the presence of the double drivers 11, 12 is made to rotate in the opposite direction.

We claim:

1. In a variable speed gearing having a plurality of sets of gears, a brake mechanism comprising a pair of brake bands for acting on each set of gears, said bands being fixed at one end, a rotatable shaft extending through the free ends of said bands, and cams on said shaft for successively tightening said pairs of bands when said shaft is rotated in one direction.

2. In a variable speed gearing having a plurality of sets of gears, a brake mechanism comprising a pair of brake bands encircling each set of gears, said bands being fixed at one end, a shaft extending through the free ends of said bands, and cams on said shaft for tightening said bands, the cams adapted to act on the bands of any one pair being arranged at an angle of 180° to each other.

3. In a variable speed gearing having a plurality of sets of gears, a brake mechanism comprising a pair of substantially semicircular brake bands encircling each set of gears, said bands being fixed at one end and having overlapping free ends, a shaft extending through the free ends of said bands, and cams on said shaft for tightening said bands, the cams adapted to act on the bands of any one pair being arranged at an angle of 180° to each other.

4. In a variable speed gearing having a plurality of sets of gears, a brake mechanism comprising a pair of substantially semicircular brake bands encircling each set of gears, said bands being fixed at one end and having overlapping free ends, a shaft extending through the free ends of said bands, and cams on said shaft for tightening and releasing each pair of bands in a predetermined sequence in the course of a revolution of said shaft, said cams being in such mutual angular relation that the bands of one pair are released before the bands of the next pair are tightened.

In testimony whereof we affix our signatures in presence of two witnesses.

GUST. LINDÉN.
ANDERS GUSTAF HÖJER.

Witnesses:
PER ARON. WIGELT,
MARIA SVENSSON.